United States Patent [19]

Schwartz et al.

[11] Patent Number: 4,557,103
[45] Date of Patent: Dec. 10, 1985

[54] APPARATUS FOR SQUEEZE PACKAGING BUTTER-LIKE PRODUCTS

[75] Inventors: Charles A. Schwartz, Highland Heights; Kenyon L. Cornwell, Cleveland, both of Ohio

[73] Assignee: Sar-A-Lee, Inc., Beechwood, Ohio

[21] Appl. No.: 650,845

[22] Filed: Sep. 17, 1984

Related U.S. Application Data

[63] Continuation-in-part of Ser. No. 582,377, Feb. 22, 1984, which is a continuation-in-part of Ser. No. 451,075, Dec. 20, 1982, Pat. No. 4,447,464, which is a continuation-in-part of Ser. No. 423,063, Sep. 24, 1982, abandoned.

[51] Int. Cl.[4] ................. B65B 63/08; B65B 9/12
[52] U.S. Cl. ........................... 53/111 R; 53/127; 53/554
[58] Field of Search .............. 53/111 R, 510, 127, 53/440, 451, 554; 426/603, 392, 663

[56] References Cited

U.S. PATENT DOCUMENTS

| | | | |
|---|---|---|---|
| 2,853,390 | 9/1958 | McGowan et al. | 426/603 |
| 2,882,166 | 4/1959 | Clarke | 426/392 |
| 2,928,219 | 3/1960 | Gubler | 53/551 |
| 3,874,146 | 4/1975 | Watkins | 53/554 |
| 3,987,602 | 10/1976 | Stahl | 53/551 X |
| 4,447,464 | 5/1984 | Schwartz et al. | 426/663 |

Primary Examiner—Horace M. Culver
Attorney, Agent, or Firm—Fay, Sharpe, Fagan Minnich & McKee

[57] ABSTRACT

A butter-like product is recirculated from a mixing bowl (10) by a recirculating pump (14) until its viscosity is adjusted to the equivalent of 16,000 to 18,000 centipoise at 75° F. The viscosity adjusted butter is pumped through an aerator (22) to a closed holding tank (40). A positive displacement pump (42) recirculates the viscosity adjusted butter from the holding tank, through a recirculating feed line (44) at a preselected pressure, and back to the holding tank. A plurality of packaging machines (C) each include a metering pump (60) which pumps metered amounts of the butter from the recirculating feed line through at least one filling nozzle (62). Sheets of heat-sealable plastic material from rolls (64, 66) are heat sealed (70, 72, 74, 76) into squeeze packets surrounding the metered volumes of butter. A conveyor (100) conveys the filled squeeze packets to a fluid cooling hood (104) in which the squeeze packets are bathed in a cooling fluid, e.g., nitrogen, before the packaged butter can be adversely affected by residual heat from the heat seals.

14 Claims, 2 Drawing Figures

APPARATUS FOR SQUEEZE PACKAGING BUTTER-LIKE PRODUCTS

BACKGROUND OF THE INVENTION

This application is a continuation-in-part of U.S. application Ser. No. 582,377 filed Feb. 22, 1984, which in turn is a continuation-in-part of U.S. application Ser. No. 451,075, filed Dec. 20, 1982, now U.S. Pat. No. 4,447,464, which in turn is a continuation-in-part of U.S. application Ser. No. 423,063, filed Sept. 24, 1982, now abandoned.

The present invention pertains to the art of food processing and more particularly to the preparation of foodstuffs for filling squeeze packets. The invention finds particular application in the production of butter-filled squeeze packets and will be described with particular reference thereto. It is to be appreciated, however, that the invention is also applicable to filling squeeze packets with other foodstuffs which are damaged by heat, such as margarine, shortening and grease products, peanut butter, cheese spreads, other shortening or grease-containing products, and the like.

Heretofore, various condiments, such as mayonnaise, mustard, honey, relish, and others, have been available in single serving squeeze packets. In a conventional packaging system, each packaging machine has an attached supply hopper from which the product is metered into the squeeze packets. A plurality of air powered pumps disposed in a common open vat each maintain a corresponding hopper filled. The squeeze packets are commonly fashioned of two rectangular sheets of flexible plastic material generally about an inch to an inch and a half by three or four inches. The packets are heat sealed around their periphery to define a condiment-holding, heat-sealed squeeze packet. Of the many condiments available in squeeze packets, butter is conspicuously absent.

Individual servings of butter are not commonly available in squeeze packets. Rather, slices or patties of butter are normally individually paper or foil wrapped, packaged in stiff plastic containers with peel-off tops, or the like. These types of containers require a knife to spread the contents. By distinction, the contents of squeeze packets can be spread directly. The physical properties of butter have required that it be packaged in these other types of packages rather than squeeze packets. Butter is relatively hard or stiff in its normal, crystalline state. Although it is recognized that butter can be made liquid by increasing the temperature, it is generally considered undesirable to do so because elevated temperatures permanently alter the physical properties of butter. Specifically, butter is an emulsion which breaks down or becomes clarified at elevated temperatures. Once the emulsion is broken, the butter will not set or recrystallize into the same physical structure. Rather, it will have a different color, texture, consistency, and the like, creating a different, less desirable appearance and flavor.

Further, squeeze packets are normally heat sealed at temperatures which are sufficient to soften plastic sheet material, e.g., 200° F. to 300° F. The residual heat in the heat sealed plastic is sufficient to cause the butter emulsion to be broken. Specifically, butter adjacent the heat seal tends to turn a darker yellow color and change texture and consistency creating a different visual appearance often taken for spoilage.

The prior art individual serving butter packages have been relatively expensive and are relatively easily damaged in handling and shipment. The packaging machines for producing the prior art butter individual serving packages tend to run relatively slowly and the packaging operation tends to be relatively labor intensive.

The present invention provides a new and improved processing method which overcomes the above-referenced problems and others to provide for the production of butter and like foodstuff filled squeeze packets.

SUMMARY OF THE INVENTION

In accordance with the present invention, there is provided an apparatus for packaging a product which is damagable by heat in heat-sealed squeeze packets. A viscosity adjusting means adjusts the viscosity of the product to about 16,000 to 18,000 centipoise at 75° F. or the equivalent. A pump means selectively pumps preselected volumes of the product to at least one filling nozzle. A sheet feeding means feeds sheets of a heat sealable material adjacent opposite sides of the filling nozzle. A heat sealing means heat seals the sheets into an open, generally U-shaped pocket partially surrounding each filling nozzle. After the pump means pumps the preselected volume of product into the open pocket, the heat sealing means heat seals the open pocket into a closed pocket surrounding the preselected product volume forming a filled squeeze packet. A cooling means is disposed contiguous to the filling nozzle to bath the filled squeeze packet in a cooling fluid such that a cooling fluid withdraws heat from the heat-sealed sheets before the product is damaged by the residual heat therein.

In accordance with a more limited aspect of the invention, the product is butter.

In accordance with another more limited aspect of the invention, the fluid cooling means baths the heat-sealed packets in a bath of nitrogen.

A primary advantage of the present invention is that it enables squeeze packets to be filled with butter and other heat damagable foodstuffs.

Another advantage of the present invention is that it packages butter relatively quickly and efficiently.

Yet another advantage of the present invention is that it enables butter to be packaged in relatively durable and easily handled individual serving packets.

Still further advantages of the present invention will become apparent to others upon reading and understanding the following detailed description of the preferred embodiment.

BRIEF DESCRIPTION OF THE DRAWINGS

The invention may take form in various parts and arrangements of parts. The drawings are only for purposes of illustrating the preferred embodiment of the present invention and are not to be construed as limiting it.

DETAILED DESCRIPTION OF THE PREFERRED EMBODIMENT

Figures 1, 2:
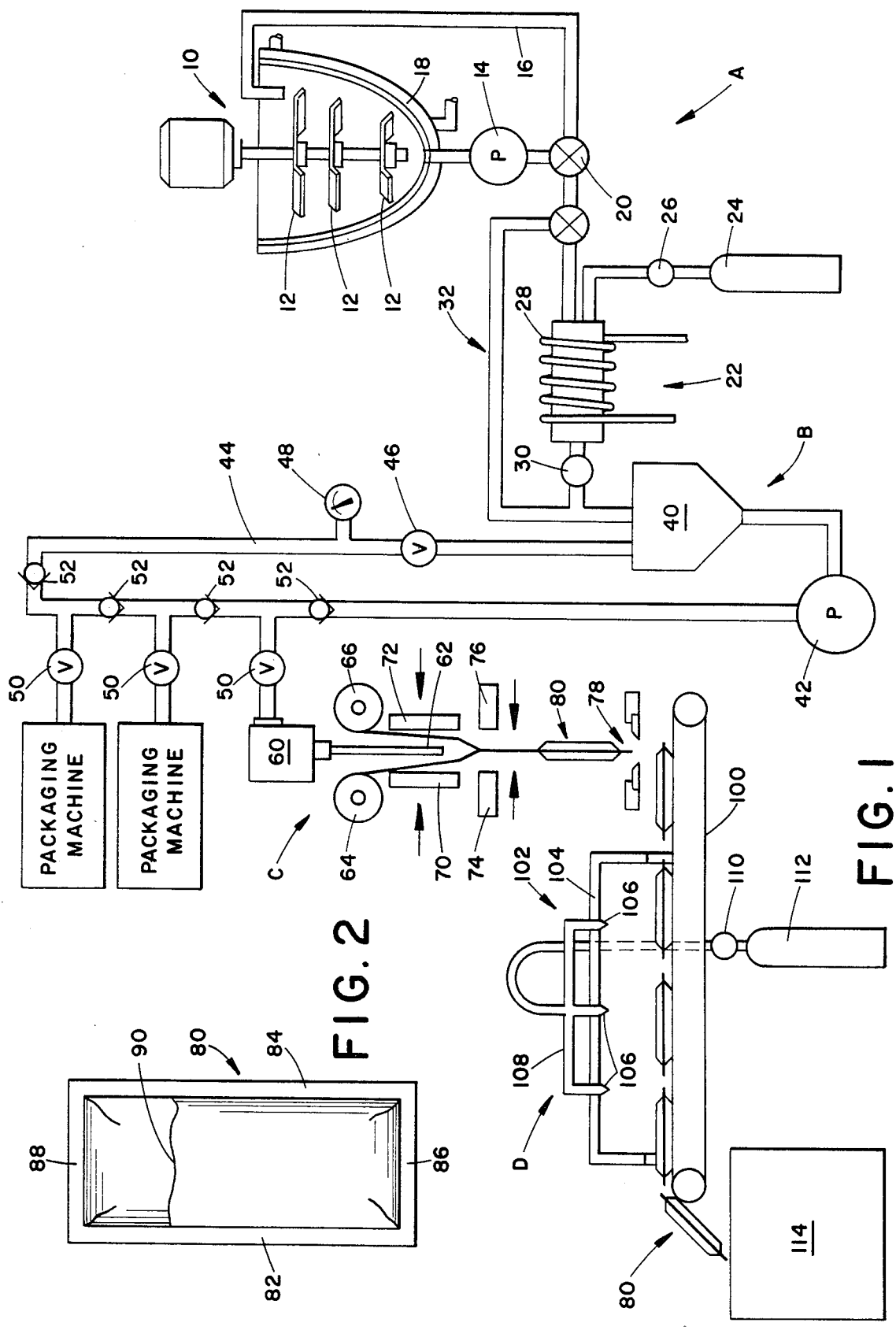
FIG. 1 is a diagrammatic illustration of a packaging apparatus in accordance with the present invention; and, FIG. 2 is a sealed squeeze packet in accordance with the present invention.

Butter is an emulsion of fat, oil, water and solids. The emulsion is solid or crystallized at room temperature and below. Just below normal body temperature, the emulsion breaks down or separates, releasing the fat and oil components to provide the recognizable butter taste. In the preferred embodiment, butter is the product to be packaged. However, other similar products, such as margarine, are packagable with the present method and apparatus. In margarine, the exact emulsion and its properties vary. However, the margarine emulsion is commonly selected to imitate the characteristics of butter closely. Other emulsions of fat and water such as shortenings, peanut butter, cheese spread, and the like, can exhibit analogous properties.

With reference to FIG. 1, the packaging apparatus includes a viscosity adjusting means A for adjusting the viscosity of the butter or other heat damagable product to an appropriate viscosity for packaging. In the preferred embodiment, the packaging viscosity is in the range of 16,000 to 18,000 centipoise at 75° F., or the equivalent. A feed and transporting system B circulates the product with the packaging viscosity to a plurality of packaging machines or means C. Each packaging means packages preselected volumes of the product in heat-sealed packets. A cooling means D cools each heat-sealed packet to remove the residual heat from the heat seal before the product is damaged.

In the preferred embodiment, the viscosity adjusting means A includes a jacketed mixing bowl or kettle 10 which receives blocks of room temperature product. Room temperature is considered to be in the range or about 65° F. to 85° F., with 75° F. being preferred. As a first step in the viscosity adjusting process, a plurality of paddles 12 rotate to break up the blocks and render the product generally uniform.

A recirculating pump 14 pumps butter from the bottom of the mixing bowl through a recirculation line 16 and back in the top of the mixing bowl. The recirculation breaks up the butter further and renders it relatively uniform. Further, the recirculation tends to reduce the viscosity of the product.

Further viscosity adjustment is provided by passing hot or cold fluids through a jacket 18 of the mixing bowl. The viscosity is reduced by passing a burst of steam through the jacket followed by cold water to remove excess heat. The steam burst should be sufficiently short that the heat transfer through the kettle does not heat the product to the temperature which irreversibly damages the product.

When the product viscosity has been adjusted to 16,000 to 18,000 centerpoise at room temperature, a diverter valve 20 diverts the product from the recirculation path to an aerator or whipper 22. The aerator or whipper 22 adjusts the viscosity by injecting and mixing a gas into the butter. In the preferred embodiment, the gas is gaseous nitrogen from a nitrogen source 24 which is regulated by regulator valve 26. A typical butter aerator or whipper consists of a spool disposed within a tubular line such that the aerator is essentially a tube within a tube. The spool includes contracted regions and flanges and a plurality of nitrogen expelling orifices. As the butter passes through the aerator, the surface projections and constrictions as well as the injected nitrogen whip the butter. The degree of whipping can be adjusted by adjusting the amount of nitrogen injected, the butter pumping rate, and the like.

It is important that the temperature of the butter be maintained close to room temperature. At temperatures above 92° F., the butter irreversibly breaks down, degrading its quality. Other heat damagable products also have quality degradation temperatures at which they degrade noticably. If the product temperature becomes too low, the packaging machines will not function properly. To maintain the proper temperature, a heat adjusting jacket 28 is provided around the aerator to add or remove heat as may be required.

A pressure regulator 30 maintains the whipped butter at a preselected elevated pressure which helps to maintain the nitrogen in suspension in the butter. The whipped butter is passed to the feed system B. Optionally, a bypass line 32 may bypass the aerator 22 to provide non-whipped product to the feed system for packaging.

The room temperature butter with its viscosity adjusted as is appropriate to the packaging means C is received by the feed system B, more specifically, in a closed holding tank 40. It is a property of butter that it will continue to hold the adjusted viscosity for about a half hour or so without the application of additional heat. Thereafter, recrystallization tends to raise the viscosity and render it too stiff for the packaging machinery.

The feed and transporting system B includes a positive displacement pump 42 which withdraws product of the packaging viscosity from the holding tank 40 and recirculates it through a recirculating feed line 44 back into the top of the holding tank. A pressure regulating valve 46 and a pressure gauge 48 are disposed near the end of the recirculating feed line to maintain a preselected pressure therein. In the preferred embodiment, the preselected pressure is in the range of 20 to 30 pounds per square inch. A plurality of taps, each controlled by a shutoff valve 50 feed the packaging viscosity product from the recirculating feed line 44 to one of the packaging machines C. A plurality of check valves 52 are disposed in the recirculating feed line between the packaging machine taps to assure unidirectional circulation of the product.

Each of the packaging means C includes a metering means 60 such as a slug pump which meters or pumps a preselected volume of product in each stroke from the recirculating line 44 to a filling nozzle 62. In the preferred embodiment, the slug pump has a plurality of pistons to pump a metered volume of the butter to each of a plurality of filling nozzles 62. Rolls 64 and 66 of a heat-sealable material, such as polyethylene, polyester, and the like, each feed a flat sheet of the heat-sealable material to either side of the filling nozzle 62. A heat sealing means heat seals the sheets into an open, generally U-shaped pocket partially surrounding each filling nozzle. More particularly, verticlly extending heat sealing means 70 and 72 come together in coordination to either side of the filling nozzle to heat the sides of a squeeze packet together. Concurrently, transverse heat sealing means 74 and 76 come together to close the bottom of the pocket to be filled, thus forming a generally U-shaped, open pocket partially surrounding each filling tube. After the pumping means 60 pumps the preselected volume of product into the open pocket, the heat-sealable sheets and the open pocket advance the length of one pocket. As the heat sealing means forms the next generally U-shaped pocket, the transverse heat sealing means 74 and 76 simultaneously heat seal the top of the just-filled pocket, thus completing a squeeze packet. Concurrently, a cutter 78 cuts the filled squeeze packets 60 apart allowing them to drop from the packaging apparatus C.

With reference to FIG. 2, each heat-sealed squeeze packet 80 is heat sealed along its vertical or side edges 82 and 84, along its base edge 86, and along its top edge 88. When the package is held vertically during the heat sealing and cutting steps, the butter settles below the top edge of the packet such that its upper surface 90 is disposed an half inch or more from the upper heat seal 88. Accordingly, sealing the top edge 88 of the packet normally does not adversely affect the packaged butter until the package is tipped horizontally and the butter is allowed to contact it. However, the heat seals along the other three sides 82, 84, and 86 have a residual heat buildup therein. The plastic material holds the heat for a sufficiently long time that even after the cutting step, there is still a large amount of heat in the heat seals. Gradually, this residual heat is absorbed by the packaged product. Because the heat sealing generally takes place in a temperature range of 200°–300° F., there is sufficient residual heat to break down the butter irreversibly or clarify it. Even butter which does not break down discolors around the edges from the heat to a darker yellow. However, a small amount of time is required for this heat to be conveyed into the butter. The packaging means cycles, i.e., fills and seals a squeeze packet, more frequently than once a second. In the preferred embodiment, the packaging means cycles several times a second. Thus, the heat-sealed squeeze packets are filled and cut and the filling process completed in about a second or less. This time is insufficient for the heat to travel from the heat seals into the butter and discolor it or adversely affect it.

The cooling means D is disposed closely contiguous to the packaging means B. Particularly, the cooling means is immediately downstream from the filling nozzle and the heat sealing means to withdraw the residual heat from the heat seals before it adversely affects the packaged butter. The cooling means includes a conveyor 100 such as a metal mesh conveyor. The metal mesh conveyor has relatively good heat transfer properties and starts the process of withdrawing heat from the package. Optionally, the conveyor may be cooled with a water bath or the like during its return travel to accentuate its cooling role.

The conveyor 100 conveys the heat-sealed packets into a fluid cooling means 102 which baths the filled squeeze packets in a cooling fluid which removes the residual heat from the heat seals before the butter is damaged by the heat therein. In the preferred embodiment, the fluid cooling means 102 includes a hood 104 under which the squeeze packets pass. A plurality of fluid injecting nozzles 106 discharge cooling fluid over and around the squeeze packets. In the preferred embodiment, the fluid injecting nozzles 106 cause a compressed gas, preferrably nitrogen, to undergo a phase change from a liquid to a gaseous state. As the gas undergoes the phase change and expansion, it absorbs large amounts of heat, sufficient to lower and maintain the pressure under the hood many degrees below 0° F. The fluid nozzles 106 are connected by a manifold 108 and a pressure regulator valve 110 with a compressed nitrogen cylinder 112 or other source of compressed inert gas. At the end of the conveyor, the cooled squeeze packets are discharged into a packing box 114 or other receiver.

The invention has been described with reference to the preferred embodiment. Obviously, modifications and alterations will occur to others upon reading and understanding the preceding detailed description of the preferred embodiment. It is intended that the invention be construed as including all such alterations and modifications and so far as they come within the scope of the appended claims or the equivalents thereof.

Having thus described the preferred embodiment, the invention is now claimed to be:

1. An apparatus for packaging products which are damagable by heat in heat-sealed squeeze packets, the apparatus comprising:
   a viscosity adjusting means for adjusting the viscosity of the product to the equivalent of about 16,000 to 18,000 centipoise;
   a metering means for selectively metering preselected volumes of the product to at least one filling nozzle;
   sheet feeding means for feeding sheets of a heat-sealable material adjacent opposite sides of the filling nozzle;
   heat sealing means for heat sealing the sheets into closed packets surrounding the preselected product volumes from the metering means to form filled squeeze packets; and,
   cooling means disposed contiguous to the filling nozzle for cooling the squeeze packets before the product is damaged by residual heat in the heat seals.

2. The apparatus as set forth in claim 1 wherein the cooling means bathes the squeeze packets in a cooling fluid, such that the cooling fluid withdraws heat from the heat seals.

3. The apparatus as set forth in claim 2 wherein the fluid cooling means includes a plurality of compressed gas nozzles which allow a compressed gas to undergo a reduction in pressure such that gas expansion causes cooling.

4. The apparatus as set forth in claim 3 wherein the fluid cooling means further includes a hood surrounding the gas nozzles for confining the expanded gas to the area of the sealed packets.

5. The apparatus as set forth in claim 4 wherein the fluid cooling means further includes a conveying means for conveying the heat-sealed squeeze packets from the heat sealing means to the gas nozzles.

6. The apparatus as set forth in claim 5 further including cutting means disposed between the heat sealing means and the fluid cooling means for separating the filled squeeze packets.

7. The apparatus as set forth in claim 1 wherein the viscosity adjusting means includes a recirculating pump for pumping the product from a reservoir therethrough and back to the reservoir.

8. The apparatus as set forth in claim 7 further including heating means disposed surrounding the reservoir for selectively adjusting the temperature of the product therein.

9. The apparatus as forth in claim 7 further including an aerating means for injecting a gas into the product to whip it and adjust its viscosity.

10. The apparatus as set forth in claim 1 wherein the metering means pumps the preselected product volume to a plurality of filling nozzles and wherein the heat sealing means seals a pocket partially surrounding each of the filling nozzles and heat seals each partially surrounding pocket into the filled squeeze packet.

11. The apparatus as set forth in claim 1 further including a product feed system for feeding the product from the viscosity adjusting means to the metering means, the feed system including:

a closed holding tank for receiving the product from the viscosity adjusting means;

a pump for recirculating the product from the holding tank, through a recirculating feed line, and back to the holding tank; and, wherein the metering means is operatively connected with the recirculating feed line to meter product therefrom.

12. The apparatus as set forth in claim 11 wherein the product feed system includes a pressure regulating means for maintaining a preselected pressure within the recirculating feed line.

13. The apparatus as set forth in claim 11 further including an aerating means disposed upstream from the holding tank for whipping the product fed thereto.

14. The apparatus as set forth in claim 13 further including back pressure controlling means disposed between the aerator means and the holding tank for controlling pressure of the whipped product.

* * * * *